US009918242B2

United States Patent
Radunovic et al.

(10) Patent No.: US 9,918,242 B2
(45) Date of Patent: Mar. 13, 2018

(54) DYNAMIC CHANNEL SELECTION IN A WIRELESS COMMUNICATION NETWORK

(71) Applicant: Microsoft Technology Licensing, LLC, Redmond, WA (US)

(72) Inventors: Bozidar Radunovic, Cambridge (GB); Ramachandran Ramjee, Bangalore (IN); Krishna Kant Chintalapudi, Karnataka (IN); Deeparnab Chakrabarty, Karnataka (IN); Apurv Bhartia, San Mateo, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 208 days.

(21) Appl. No.: 14/832,713

(22) Filed: Aug. 21, 2015

(65) Prior Publication Data

US 2017/0055179 A1    Feb. 23, 2017

(51) Int. Cl.
| | | |
|---|---|---|
| *H04W 28/08* | (2009.01) |
| *H04L 5/00* | (2006.01) |
| *H04W 24/08* | (2009.01) |
| *H04W 72/08* | (2009.01) |
| *H04W 36/00* | (2009.01) |

(52) U.S. Cl.
CPC ........... *H04W 24/08* (2013.01); *H04L 5/006* (2013.01); *H04L 5/0096* (2013.01); *H04W 36/00* (2013.01)

(58) Field of Classification Search
None
See application file for complete search history.

(56) References Cited

U.S. PATENT DOCUMENTS

| | | | | |
|---|---|---|---|---|
| 5,870,666 A | * | 2/1999 | Tanaka ............... | H04W 72/085 455/226.1 |
| 5,878,350 A | * | 3/1999 | Nakamura ........... | H04W 52/40 370/332 |

(Continued)

OTHER PUBLICATIONS

Maraverdis-Rethink, "iPass Wi-Fi Growth Map Shows 1 Public Hotspot for Every 20 People on Earth by 2018", retrieved Apr. 10, 2015, http://www.ipass.com/press-releases/ipass-wi-fi-growth-map-shows-one-public-hotspot-for-ewery-20-people-on-earth-by-2018/, 3 pages.

(Continued)

*Primary Examiner* — Candal Elpenord
(74) *Attorney, Agent, or Firm* — Holzer Patel Drennan

(57) ABSTRACT

A dynamic channel selection approach for wireless communication networks is provided by measuring an ineffective communication metric on a currently-used channel. The network can switch channels if the ineffective communication metric from a device on the network satisfies a channel selection condition. To change the wireless communication network to the new channel, all network devices in the wireless communication network are instructed to switch to the new channel. As network communications start on the new channel, the ineffective communication metric measurements begin again on the new channel. Communications on the new channel continue until the channel selection condition is satisfied on the new channel, at which point another random selection of a channel is executed. The process continues in such iterations during the operation of the network and its network devices.

22 Claims, 10 Drawing Sheets

(56) References Cited

U.S. PATENT DOCUMENTS

| | | | |
|---|---|---|---|
| 8,005,055 B2 | 8/2011 | Kwak et al. | |
| 8,116,285 B1 | 2/2012 | Barnum | |
| 8,326,313 B2 | 12/2012 | McHenry et al. | |
| 8,422,444 B2 | 4/2013 | Gunawardena et al. | |
| 8,451,733 B2 | 5/2013 | Chao | |
| 8,559,362 B2 | 10/2013 | Vujcic et al. | |
| 8,666,317 B2 | 3/2014 | Choudhury et al. | |
| 8,670,763 B1* | 3/2014 | Oroskar | H04W 36/0061 370/331 |
| 8,699,430 B2 | 4/2014 | Chandramouli et al. | |
| 8,937,928 B2 | 1/2015 | Ngo | |
| 2006/0072602 A1 | 4/2006 | Achanta | |
| 2006/0292988 A1* | 12/2006 | Yuen | H04L 1/0026 455/62 |
| 2010/0103850 A1* | 4/2010 | Gossain | H04W 72/0426 370/312 |
| 2010/0177639 A1* | 7/2010 | Nam | H04W 72/082 370/237 |
| 2011/0292897 A1* | 12/2011 | Wu | H04W 72/0486 370/329 |
| 2012/0311173 A1 | 12/2012 | Agarwal et al. | |
| 2013/0059626 A1* | 3/2013 | Hopkins | H04W 48/18 455/552.1 |
| 2014/0036791 A1 | 2/2014 | Kornacki | |
| 2014/0313890 A1 | 10/2014 | Shrote et al. | |

OTHER PUBLICATIONS

Bianchi, Giuseppe, "Performance Analysis of the IEEE 802.11 Distributed Corrdination Function", In Journal of IEEE on Selected Areas in Communications, vol. 18, Issue 3, Mar. 2000, pp. 535-547.

Chieochan et al., "Channel Assignment Schemes for Infrastructure-Based 802.11 WLANS: A Survey", In Journal of IEEE Communications Surveys & Tutorials, vol. 12, Issue 1, Jan. 1, 2010, pp. 124-136.

Eisenblatter, et al., "Integrated Access Point Placement and Channel Assignment for Wireless LANs in an Indoor Office Environment", In IEEE International Symposium on a World of Wireless, Mobile and Multimedia Networks, Jun. 18, 2007, 10 pages.

Gast, Matthew S., "802.11 Wireless Networks: The Definitive Guide", In Proceedings of O'Reilly Media, Apr. 2005, 730 pages.

Hallórsson, Magnús M., "A Still Better Performance Guarantee for Approximate Graph Coloring", In Journal of Information Processing Letters, vol. 45 Issue 1, Jan. 25, 1993, 5 Pages.

Hills, Alex, "Large-Scale Wireless LAN Design", In IEEE Communications Magazine, vol. 39, Issue 11, Nov. 2001, pp. 98-107—abstract only.

Leighton, Frank Thomson, "A Graph Coloring Algorithm for Large Scheduling Problems", In Journal of Research of the Notional Bureau of Standards, vol. 84, Issue 6, Jun. 6, 1979, pp. 489-506.

Ling et al., "Joint Access Point Placement and Channel Assignment for 802.11 Wireless LANs", In Proceeding of IEEE Wireless Communications and Networking Conference, vol. 5, No. 10, Oct. 2006, pp. 2705-2711.

Mishra et al., "Distributed Channel Management in Uncoordinated Wireless Environments", In Proceedings of the 12th annual international conference on Mobile computing and networking, Sep. 23, 2006, pp. 170-181.

Mishra, et al., "Weighted Coloring based Channel Assignment for WLans", In Proceedings of ACM SIGMOBILE Mobile Computing and Communications Review, vol. 9, Issue 3, Jul. 2005, 12 pages.

Motwani, et al., "Randomized Algorithms", In Journal of ACM Computing Surveys, vol. 28, Issue 1, Mar. 1996, 5 pages.

Rayanchu, et al., "FLUID: Improving Throughputs in Entreprise Wireless LANs through Flexible Channelization", In Proceedings of the 17th Annual International Conference on Mobile Computing and Networking, Sep. 19, 2011, 12 pages—abstract only.

Rodrigues, et al., "On the Design and Capacity Planning of a Wireless Local Area Network", In Proceedings of IEEE/IFIP Network Operations and Management Symposium, Apr. 10, 2000, 14 pages.

Shrivastava, et al., "PIE in the Sky: Online Passive Interference Estimation for Enterprise WLANs", In Proceedings of the 8th USENIX Conference on Networked Systems Design and Implementation, Mar. 30, 2011, 14 pages.

Wertz, et al., "Automatic Optimization Algorithms for the Planning of Wireless Local Area Networks", In Proceedings of IEEE 60th Vehicular Technology Conference, vol. 4, Sep. 26, 2004, 5 pages—abstract only.

Wilson, Robert A., "Graph, Colourings, and Four-Colour Theorem", In Oxford Science Publications, Dec. 31, 2001, 1 page.

Zuckerman, David, "Linear Degree Extractors and the Inapproximability of Max Clique and Chromatic Number", In Proceedings of Theory of Computing, vol. 3, No. 1, Aug. 6, 2007, 26 pages.

Bhartia, et al., "WiFi-XL: Extending WiFi to Wide Areas in White Spaces", In Technical Report MSR-TR-2014-132, Oct. 2014, 22 pages.

Radunovic, et al., "Dynamic Channel, Rate Selection and Scheduling for White Spaces Interface", In Proceedings of the 7th International Conference on emerging Networking Experiments and Technologies, Dec. 6, 2011, 12 pages.

Yuan, et al., "KNOWS: Kognitiv Networking over White Spaces", In Proceedings of IEEE Dynamic Spectrum Access Networks, Apr. 2007, 12 pages.

So, et al., "Routing and Channel Assignment in Multi-Channel Multi-Hop Wireless Networks with Single Network Interface", In Proceedings of the Second International Conference on Quality of Service in Heterogeneous Wired/Wireless Networks, Aug. 2005, 20 pages.

Lim, et al., "A Context-aware and Intelligent Dynamic Channel Selection Scheme for Cognitive Radio Networks", In Proceedings of 4th International Conference on Cognitive Radio Oriented Wireless Networks and Communication, Jun. 22, 2009, 6 pages.

Pakparvar, et al., "Dynamic Channel Selection Algorithms for Coexistence of Wireless Sensor Networks and Wireless LANs", In Proceedings of 1st International Workshop on Internet of Things Communications and Technologies, Oct. 2013, 6 pages.

"Spectrum Database", Retrieved on: Apr. 6, 2015 Available at: https://www.google.com/get/spectrumdatabase/channel/.

"Wi-Fi Wireless Trends 2015: The New Network", In Proceedings of Pipeline, vol. 11, Issue 6, Dec. 2014, 2 pages.

Bahl, et al., "SSCH: Slotted Seeded Channel Hopping for Capacity Improvement in IEEE 802.11 Ad-Hoc Wireless Networks", In Proceedings of 10th Annual International Conference on Mobile Computing and Networking, Sep. 26, 2004, pp. 216-230.

Bahl, et al., "White Space Networking with Wi-Fi like Connectivity", In Proceedings of the ACM SIGCOMM Conference on Data Communication, Aug. 17, 2008, pp. 27-38.

Barenboim, et al., "Distributed ($\Delta$+1)-Coloring in Linear (in $\Delta$) Time", In Proceedings of Forty-First Annual ACM Symposium on Theory of Computing, May 31, 2009, pp. 111-120.

\* cited by examiner

DYNAMIC CHANNEL SELECTION IN A WIRELESS COMMUNICATION NETWORK

BACKGROUND

Interference in WiFi network operation is a growing problem as increasing numbers of WiFi networks are deployed in close proximity to each other. WiFi networks typically offer one or more communication channels allocated within a large frequency range for the wireless communication networking protocol (e.g., 14 frequency range "channels" allocated within the range of 2400 MHz to 2500 MHz for 802.11n (a, b, g, n)). Excessive network traffic sharing the same communication channel of a network can contribute to network traffic congestion and degrade WiFi network performance. Although WiFi networks and devices can accommodate the multiple communications channels through which devices may communicate, congestion can occur arbitrarily on any channel at any time, negatively affecting communication performance for applications such as video streaming, etc. Furthermore, wireless environments present highly dynamic interference conditions, making it difficult to provide an equally dynamic and yet effective solution.

SUMMARY

The described technology provides a dynamic channel selection approach for wireless communication networks. By measuring an ineffective communication metric on a channel being used by a wireless communication network, the network can change to a different channel if the ineffective communication metric from one or more devices on the network satisfies a channel selection condition. To change the wireless communication network to the new channel, all network devices in the wireless communication network are instructed to switch to the new channel. Responsive to the start of network communications on the new channel, the ineffective communication metric measurements begin again on the new channel. In one implementation, the channel selection condition is based on a random (e.g., exponentially distributed) time quantum and/or the selection of the new channel is made randomly, although variations on these aspects may also be employed. Ineffective communication metric measurements on the new channel begin after network communications have started on the new channel, and communications on the new channel continue until the channel selection condition is satisfied on the new channel, at which point another random selection of a channel is executed. The process continues in such iterations during the operation of the network and its network devices. A similar process may be employed when network devices are communicating across multiple channels in the same wireless communication network.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Figure 1:
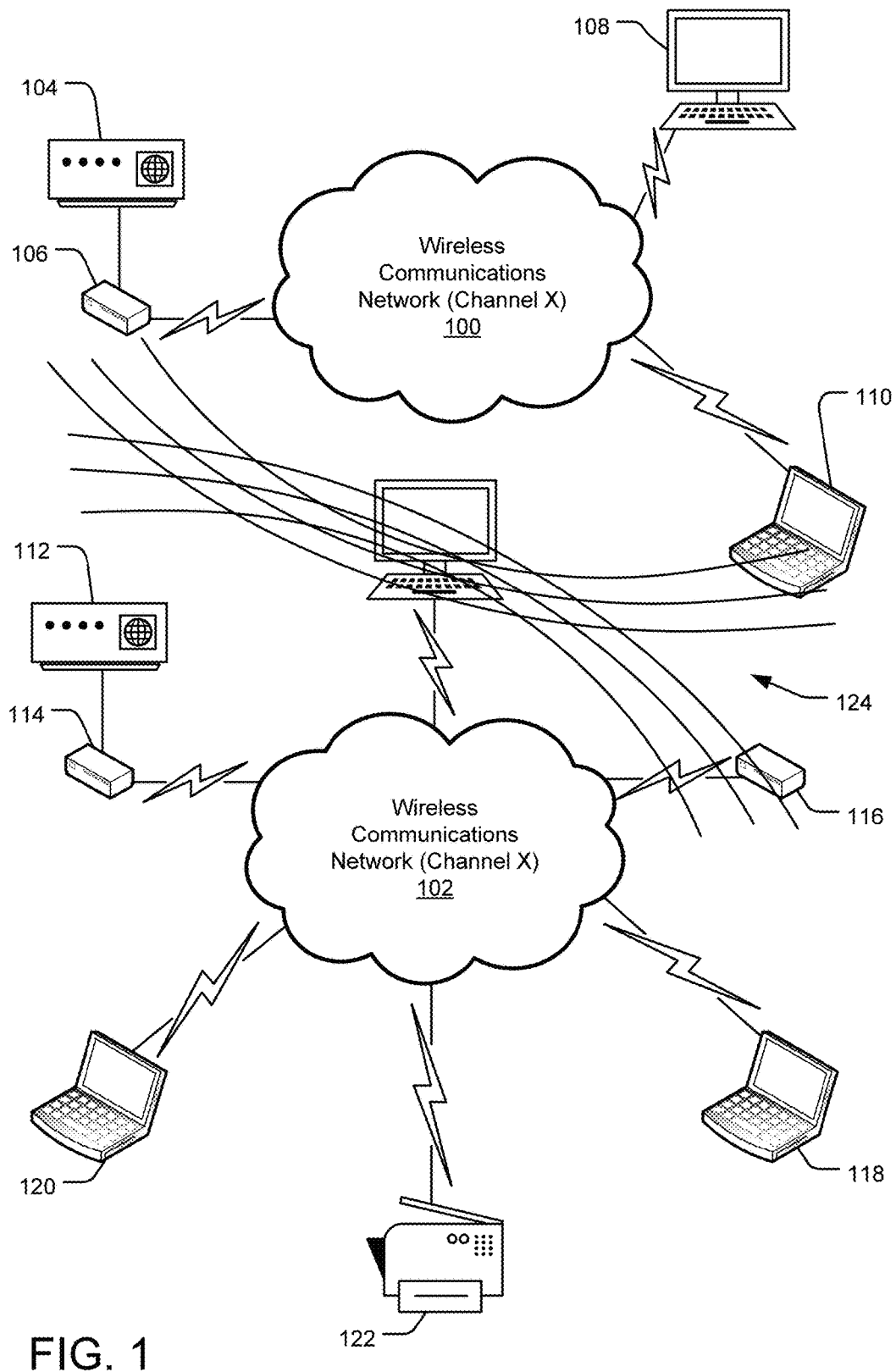
FIG. 1 illustrates two example wireless communication networks operating on the same wireless communications channel.

Wireless communications access point (APs) devices can be found in or near most residences, office, manufacturing sites, retail sites, etc. It is predicted that wireless communication's share of mobile internet traffic will rise from 70% in 2014 to 85% in 2018 (about 16 exabytes/month). Recognizing this growth trend, various telecommunication companies are deploying millions of wireless communication access point devices to provide inexpensive and readily available broadband access to mobile users. It is predicted that there will be one wireless communications access point device for every 20 people in the world by 2018. A consequence of this rapid and uncoordinated increase in wireless communications access points devices and wireless communications traffic is increased interference in wireless communications.

The described technology provides dynamic channel selection that allows a wireless communications access point device to efficiently and dynamically switch the traffic within its wireless communication network to a "good" channel in the presence of radiofrequency interference and other congestion problems. In one implementation, the described technology performs such dynamic channel selection (and switching) by performing the following operations in the order below:

(a) setting wireless communications to a wireless communications channel;
(b) setting a new channel selection condition;
(c) monitoring the "ineffective time" while transmitting and/or receiving data packets;
(d) detecting when the accumulated ineffective time for the current wireless communications channel satisfies the channel selection condition;

(e) selecting a new wireless communications channel without testing the new wireless communications channel;

(f) informing other wireless communications devices in the network of an impending switch to the new wireless communications channel; and (g) repeating the operations based on the new wireless communications channel, starting with operation (a).

In one implementation, an ineffective communication metric referred to as "ineffective-time" represents time when the wireless communications access point device has packets to transmit but attempts to transmit them are unsuccessful. Various conditions can cause unsuccessful transmissions of packets including network congestion within a wireless communication network and interference from outside the wireless communication network (e.g., traffic from other networks communicating on the same wireless communications channel, radiofrequency interference for nearby radiofrequency signal emitting devices). In an example implementation, ineffective-time can be measured by air-time utilization counters provided in the wireless communications chipsets used within the wireless communications access points or other wireless communications devices within the wireless communication network. Example airtime utilization counters count the clock cycles or other time parameters during which the communications medium (e.g., the frequency range of the wireless communication channel) was found busy as part of Carrier Sense Multiple Access (CSMA). As such, ineffective-time may correlate with congestion in the wireless communications channel, measured as the fraction of time that enough energy was present in the wireless communications channel or that a preamble was detected to cause the transmitter of the wireless communications access point device to back off. In one implementation, a single congestion measurement is obtained by averaging the ten most recent air-time utilization counter values for the current channel, although variations of this approach may be employed.

Other ineffective time measurements may be made based on i) average number of packet retransmissions (a measure of loss); ii) average contention window size (a measure of congestion in the channel); iii) average latency in transmission (combination of latency due to congestion and loss); etc. When these parameters satisfy a channel selection condition, the wireless communication network access point device can trigger the dynamic selection and switching to a new channel.

In one implementation, a network device can apply the dynamic channel selection and switching described herein or similar processes to wireless communication networks employing channel bonding. Channel bonding allows a wireless network to utilize multiple adjacent channels within an available radiofrequency spectrum to communicate with increased throughput as compared to a single channel.

In alternative implementations, operation (b) may be performed out of order or concurrently with other operations, such as operation (a). In yet other alternative implementations, operation (b) may be skipped to allow the same channel selection condition to repeat for one or more additional cycle through the operations. The described process of operations may be adjusted to support channel bonding, which is available in some wireless communication protocols.

FIG. 1 illustrates two example wireless communication networks 100 and 102 operating on the same wireless communications channel (e.g., channel X). A wireless communications channel refers to a radiofrequency range in which wireless communications devices communication with each other within a wireless communication network. A router 104 connects a wireless communication network access point device 106 to a wide-area-network (WAN—not shown) to provide communications between the wireless communication network 100 and the WAN (e.g., connecting the wireless communication network access point device 106 to an enterprise network or an Internet service provider's network). Other wireless computing devices, such as a workstation computer 108 and a mobile computer 110, may also be connected to the wireless communication network 100 to communicate with each other and to communicate outside the wireless communication network 100.

Another router 112 connects a wireless communication network access point device 114 to a wide-area-network (WAN—not shown) to provide communications between the wireless communication network 102 and the WAN (e.g., connecting the wireless communication network access point device 114 to an enterprise network or an Internet service provider's network). Other wireless computing devices, such as another wireless communication network access point device 116, mobile computers 118 and 120, and a printer 122, may also be connected to the wireless communication network 102 to communicate with each other and to communicate outside the wireless communication network 102.

Because the two wireless communication networks 100 and 102 and their member devices are communicating on the same wireless communications channel (e.g., channel X), the devices of each network are communicating within the same radiofrequency range, causing interference 124 among several of the networked devices and furthermore, between the two wireless communication networks 100 and 102 themselves. Generally, wireless communications protocols specify mechanisms for managing such interference within a wireless communication network to allow individual devices to deal with such interference while providing acceptable performance. However, if one or more devices of one wireless communication network (e.g., wireless communication network 100) generates enough traffic, such traffic can create noticeable network congestion within that network and furthermore, noticeable network congestion that can degrade the communication performance of other networks within the proximity (e.g., wireless communication network 102). Interference can be caused by other sources of radiofrequencies and network traffic, including microwave ovens, hidden interferers, and increased transmission contention.

In such circumstances, performance of a wireless communication networks can potentially be improved by changing the radiofrequency range (e.g., the wireless communications channel) in which networked member devices of a wireless communication network transmit and receive data through the wireless communication network. However, radiofrequency interference and traffic congestion within and between wireless communication networks are highly dynamic. As such, at any particular moment, one channel may provide better performance than another channel only to have the relationship reversed in the next moment.

Accordingly, the described technology provides a dynamic selection and switching of the wireless communications channel employed by devices within a wireless communication network, thereby increasing the probability of better wireless communication performance over time. Congestion on the new wireless communications channel is again monitored, and, if the new wireless communications channel eventually satisfies its dynamic selection condition, the devices switch to a new wireless communications channel and begin monitoring for congestions again on the new channel.

In one perspective, the dynamic selection and switching biases a networked device (e.g., a wireless communication network access point and associated devices on the wireless network) to quickly switch out of a poor quality (e.g., congested) wireless communications channel (e.g., where the ineffective-time accumulates quickly). Rather than attempting to identify the best new channel for switching, the networked device is triggered to switch out of the poor quality channel independent of the quality of the new wireless communications channel to which it will switch. As such, after the poor quality of the channel is detected, the networked device switches to a new channel before determining whether the new channel is any better than the previous wireless communications channel. Dynamic selection and switching will repeat on the new channel and networked devices will spend longer durations in high quality wireless communications channels and shorter durations in poor quality wireless communications channels.

Further, the quality of a wireless communications channel is highly dynamic. Accordingly, dynamic selection and switching allows the networked device to detect temporal changes to poor quality conditions on a channel and to switch out of the poor quality conditions on the channel quickly, without the overhead of attempting to identify a better channel (which could become poor quality by the time the device switches to the new channel).

Figure 2:
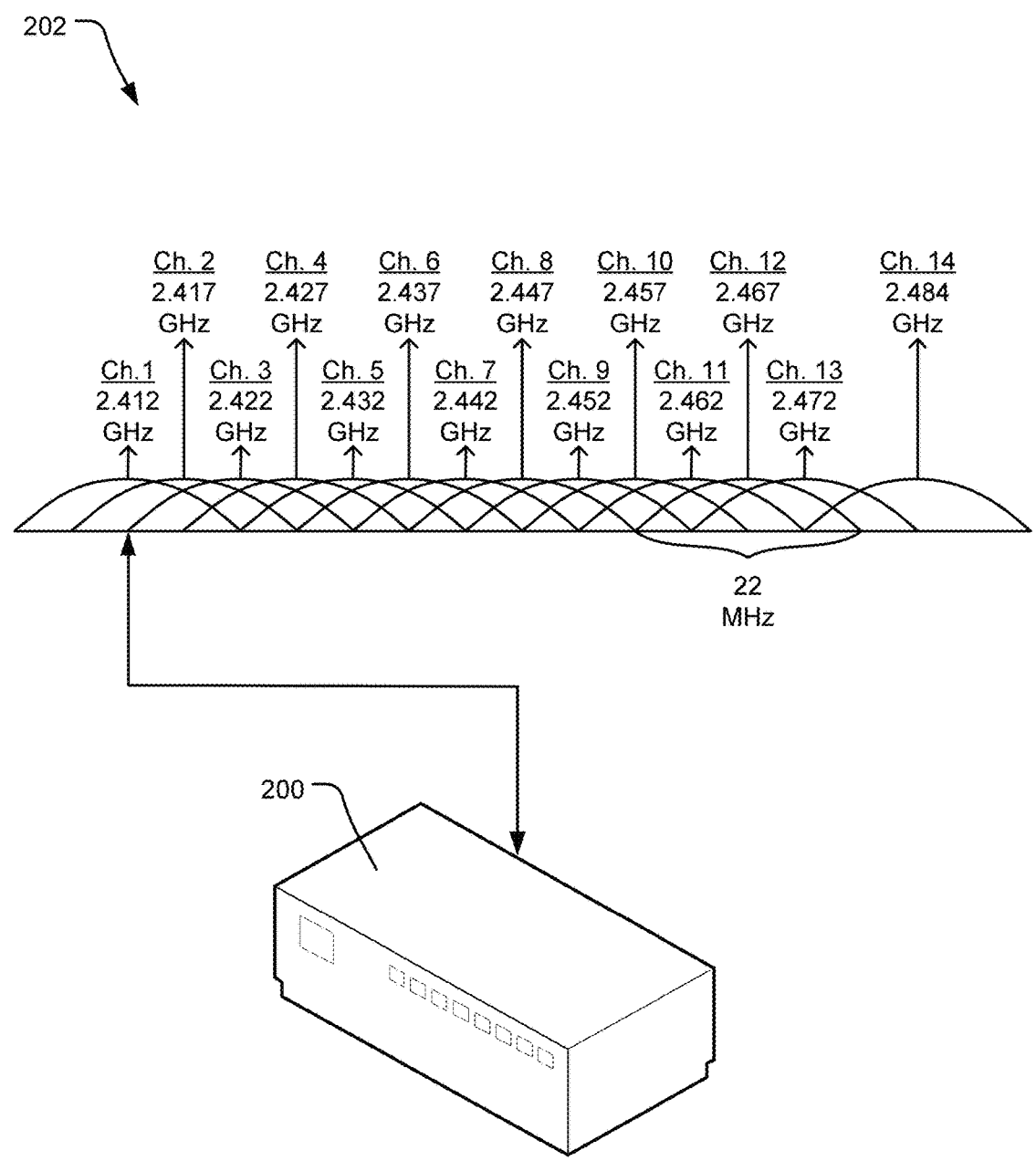
FIG. 2 illustrates an example wireless communication network access point device operating on channel 1 of a wireless communication network.

FIG. 2 illustrates an example wireless communication network access point device 200 operating on channel 1 of a wireless communication network. A radiofrequency spectrum 202 illustrates 14 channels in an 802.11 (a, b, g, n) wireless communication network operating at approximately 2.4 GHz. Other wireless communications protocols may also be managed with the dynamic selection mechanism of the described technology, including 802.11ac operating at approximately 5 GHz.

In one implementation, a transceiver circuit and an antenna in the wireless communication network access point device 200 transmits and receives signals on channel 1, which operates within a 22 MHz frequency band centered at 2.412 GHz. The wireless communications channel in which the transceiver circuit and the antenna are operating is set by a tuner circuit, which matches the frequency of the antenna to the frequency range of channel 1. A congestion monitor of the wireless communication network access point device 200 monitors the ineffective-time of the communications on channel 1, and a network channel coordinator system of the wireless communication network access point device 200 determines whether the channel selection condition has been satisfied. For example, if a time quantum τ was set for channel 1, the network channel coordinator system can determine whether the accumulated ineffective-time over the testing period (e.g., over 10 air-time utilization counter values) exceeds τ. If not, the wireless communication network access point device 200 continues communicating on channel 1. If the accumulated ineffective-time over the testing period exceeds τ, a new wireless communications channel is selected, as discussed below.

Figure 3:
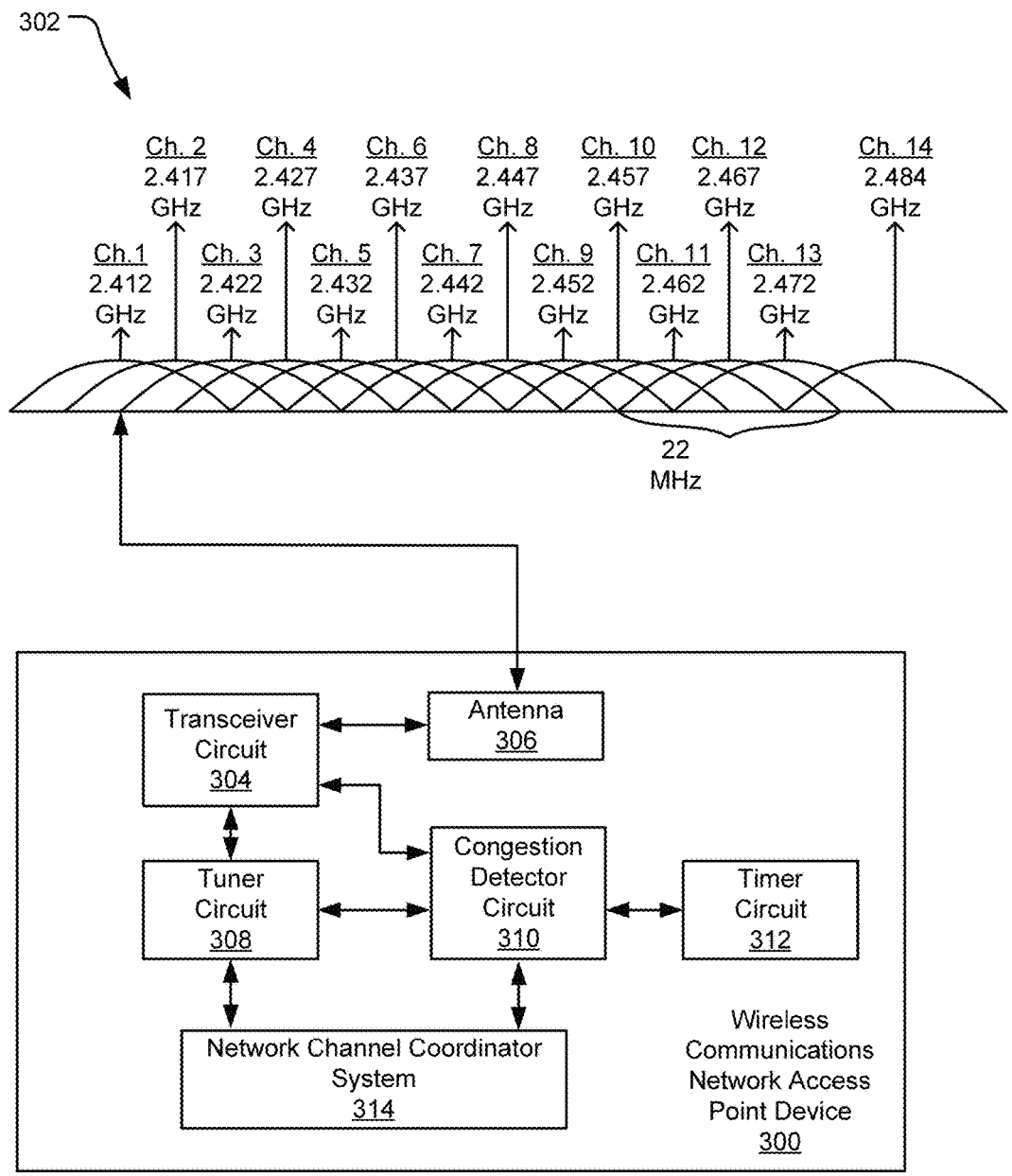
FIG. 3 illustrates an example schematic of a wireless communication network access point device operating on channel 1 of a wireless communication network.

FIG. 3 illustrates an example schematic of a wireless communication network access point device 300 operating on channel 1 of a wireless communication network. A radiofrequency spectrum 302 illustrates 14 channels in an 802.11 (a, b, g, n) wireless communication network operating at approximately 2.4 GHz. Other wireless communications protocols may also be managed with the dynamic selection mechanism of the described technology, including 802.11ac operating at approximately 5 GHz.

In one implementation, a transceiver circuit 304 and an antenna 306 in the wireless communication network access point device 300 transmits and receives signals on channel 1, which operates within a 22 MHz frequency band centered at 2.412 GHz. The wireless communications channel in which the transceiver circuit 304 and the antenna 306 are operating is set by a tuner circuit 308, which matches the operating frequency of the antenna 306 to center within the frequency range of channel 1. In one implementation, the tuner circuit 308 sets the frequency of electrical current fed to the antenna 306 by the transceiver 304 and can further set filtering and matching parameters of the transceiver circuit 304 and the antenna 306 to operate in channel 1. By changing the frequency of the electrical current fed to the antenna 306 and associated filtering and matching parameters, the tuner 308 can cause the transceiver circuit 304 and the antenna to operate in a different channel.

A congestion detector circuit 310 of the wireless communication network access point device 300 monitors the ineffective-time of the communications on channel 1. In one implementation, ineffective-time ($\tau_{wasted}$) represents the time when the wireless communication network access point device 300 is waiting for an opportunity to transmit because the channel is busy. Alternatively or additionally, ineffective-time can represent the time when the wireless communication network access point device 300 is waiting for an opportunity to transmit because data packets are lost during communications in the channel. Ψ(P) represents the effective time in the transmission of a data packet, which is the time from when the data packet is sent for transmission until the receipt of the acknowledgement (ACK) packet from the receiving node in the network (assuming no transmission-delaying congestion or packet losses (e.g., ACK packets not received in correspondence with the prior transmission of a data packet)). Ψ(P) also includes the time spent by the wireless communication network access point device 300 in processing a successfully received data packet from another node.

In one implementation, the wireless communication network access point device 300 increments the ineffective-time $\tau_{wasted}$ periodically based on a timer circuit 312. The wireless communication network access point device 300 can ignore (e.g., not increment) $\tau_{wasted}$ when there are no data packets in the transmit queue, because no time is being wasted in the absence of any packets to transmit.

Upon receipt of an ACK packet corresponding to a transmitted data packet P, the congestion detector circuit 310 subtracts effective time Ψ(P) from the accumulating ineffective-time $\tau_{wasted}$, such that $\tau_{wasted} = \tau_{wasted} - \Psi(P)$. If congestion in the channel or packet losses exist within the channel, then the resulting $\tau_{wasted}$ will be positive. Over multiple attempted transmissions in a congested channel, $\tau_{wasted}$ will continue to increase while the congestion detection circuit 310 continues to monitor channel performance.

A network channel coordinator system 314 of the wireless communication network access point device 300 determines whether the channel selection condition has been satisfied. For example, if a time quantum τ was set for channel 1, the network channel coordinator system 314 can determine whether the accumulated ineffective-time over the testing period (e.g., over 10 air-time utilization counter values) exceeds τ. If not, the wireless communication network access point device 300 continues communicating on channel 1. If the accumulated ineffective-time over the testing period exceeds τ, a new wireless communications channel is selected via the tuner circuit 308, as discussed below. The network channel coordinator system 314 informs other networked devices on the wireless network of the intent to switch channels, and then causes the transceiver circuit 304 and antenna 302 to begin transmitting on the new channel. This detection-switching cycle continues during operation of the wireless communication network access point device 300.

In one implementation, the dynamic selection process can be represented as follows, which may be preceded by an initial selection of a first channel (e.g., a random selection):

```
1:   repeat
2:       HopToSelectedChannel(Channels)
3:       τ = Exp(α)
4:       t_wasted=0
5:       Initialize a timer to fire every period δ
6:       repeat
7:           At each timer fire event
8:               If packets are in the transmit queue then
9:                   t_wasted = t_wasted + δ
10:              end if
11:          On every successful reception of an ACK patent for
                 transmission of a data packet (P)
12:              t_wasted = t_wasted − ψ(P)
13:          On every successful data packet (P) reception event
14:              If Packets are in the transmit queue
15:                  t_wasted = t_wasted − ψ(P)
16:              end if
17:      until t_wasted > τ
18:      Select new channel
19:      Inform other networked devices of impending channel change
20:  until true
```

In the above listing, HopToSelectedChannel (Channels) represents a function that switches the communication operation to a radiofrequency range corresponding to a newly selected channel. The variable τ represents the ineffective-time quantum, which is reset at each switch to a new channel using a function Exp(α) returning an exponentially distributed random channel. It should be understood that schemes for setting τ may be employed. The variable τ sets a threshold of ineffective-time (e.g., the duration for which a wireless communication network access point device 300 will tolerate a congested channel) that triggers a dynamic selection event (implemented above in line 18), which may be a random selection. Accordingly, the threshold check in line 17 represents an example dynamic selection condition that the network channel coordinator system 314 checks to determine whether to trigger a dynamic selection. If the condition is satisfied, the network channel coordinator system 314 initiates the channel change by selecting a new channel (e.g., randomly) and notifying other client devices on the wireless network of the impending channel change (line 19). In one implementation, the ineffective-time quantum variable τ is randomly selected with a mean of 10 seconds to handle rapidly changing channel traffic dynamics.

In one implementation, to notify clients before a channel change, a channel switch announcements (CSA) Information Element is included in beacons. The CSA includes an extra 5 bytes and includes a channel number field, which indicates the new bonded channel set, and a count field, which notifies when the switch to the new bonded channel set will occur. In this manner, other networked devices within the wireless communication network are synchronized concurrently to the new set of bonded channels. Other notification approaches may be employed.

Figure 4:
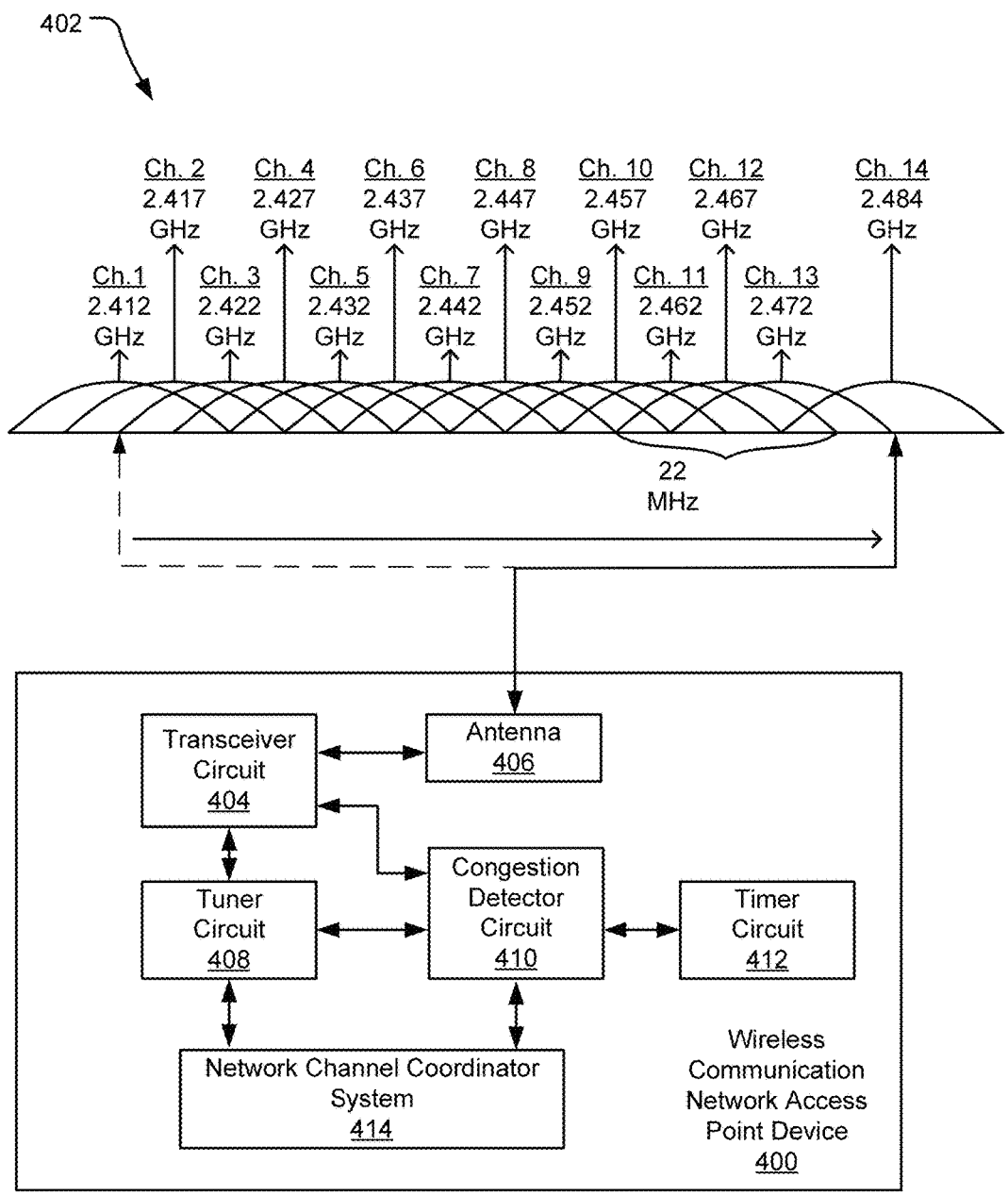
FIG. 4 illustrates an example schematic of a wireless communication network access point device operating on channel 14 of a wireless communication network, having dynamically switched from channel 1.

FIG. 4 illustrates an example schematic of a wireless communication network access point device 400 operating on channel 14 of a wireless communication network, having dynamically switched from channel 1. A radiofrequency spectrum 402 illustrates 14 channels in an 802.11 (a, b, g, n) wireless communication network operating at approximately 2.4 GHz. Other wireless communications protocols may also be managed using the dynamic selection mechanism of the described technology, including 802.11ac operating at approximately 5 GHz.

In one implementation, the congestion detector circuit 410 has detected congestion and/or packet losses during transmission in channel 1 and has determined that the detected congestion satisfies a channel selection condition set for channel 1. As a result, the congestion detector circuit 410 triggers a network channel coordinator system 414 to initiate a dynamic channel selection and switch. The network channel coordinator system 414 signals other networked devices within the wireless communication network of the impending channel change, identifying the new channel (channel 14), and then signals the tuner circuit 408 to change transmission and reception by a transceiver circuit 404 and an antenna 406 to the new channel.

Upon switching to the new channel, the congestion detector circuit 410 sets a channel selection condition for the new channel, resets the ineffective-time $\tau_{wasted}$, and begins periodically incrementing $\tau_{wasted}$ (according to the timer circuit 412) and measuring Ψ(P) for each attempted transmission.

Figure 5:
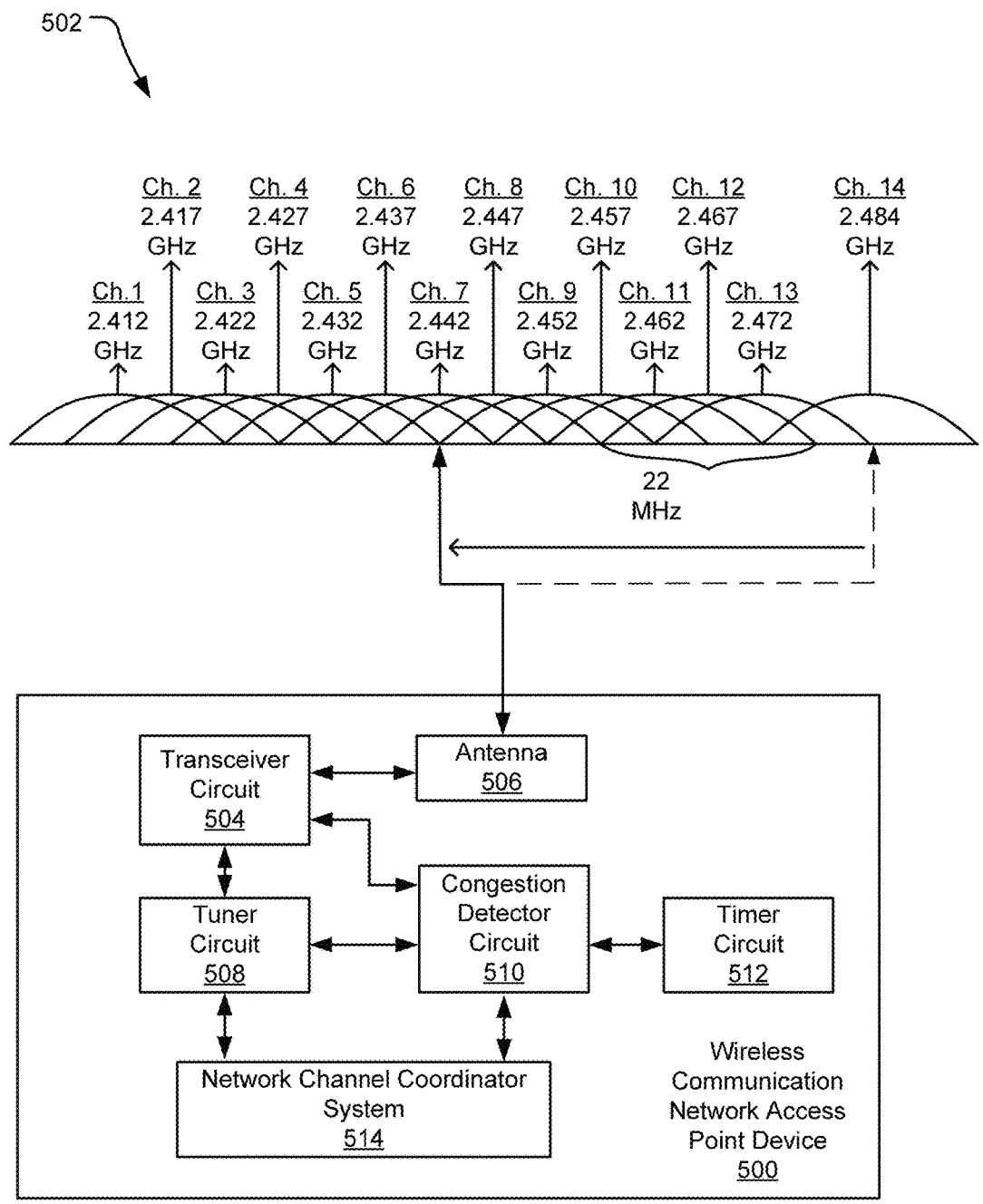
FIG. 5 illustrates an example schematic of a wireless communication network access point device operating on channel 7 of a wireless communication network, having dynamically switched from channel 14.

FIG. 5 illustrates an example schematic of a wireless communication network access point device 500 operating on channel 7 of a wireless communication network, having dynamically switched from channel 14. A radiofrequency spectrum 502 illustrates 14 channels in an 802.11 (a, b, g, n) wireless communication network operating at approximately 2.4 GHz. Other wireless communications protocols may also be managed using the dynamic selection mechanism of the described technology, including 802.11ac operating at approximately 5 GHz.

In one implementation, the congestion detector circuit 510 has detected congestion and/or packet losses during transmission in channel 14, having previously switched from channel 1 to channel 14 during a previous cycle, and has determined that the detected congestion satisfies a channel selection condition set for channel 14. As a result, the congestion detector circuit 510 triggers a network channel coordinator system 514 to initiate a dynamic channel selection and switch. The network channel coordinator system 514 signals other networked devices within the wireless communication network of the impending channel change, identifying the new channel (channel 7), and then signals the tuner circuit 508 to change transmission and reception by a transceiver circuit 504 and an antenna 506 to the new channel.

Upon switching to the new channel, the congestion detector circuit 510 sets a channel selection condition for the new channel, resets the ineffective-time $\tau_{wasted}$, and begins periodically incrementing $\tau_{wasted}$ (according to the timer circuit 512) and measuring Ψ(P) for each attempted transmission.

Figure 6:
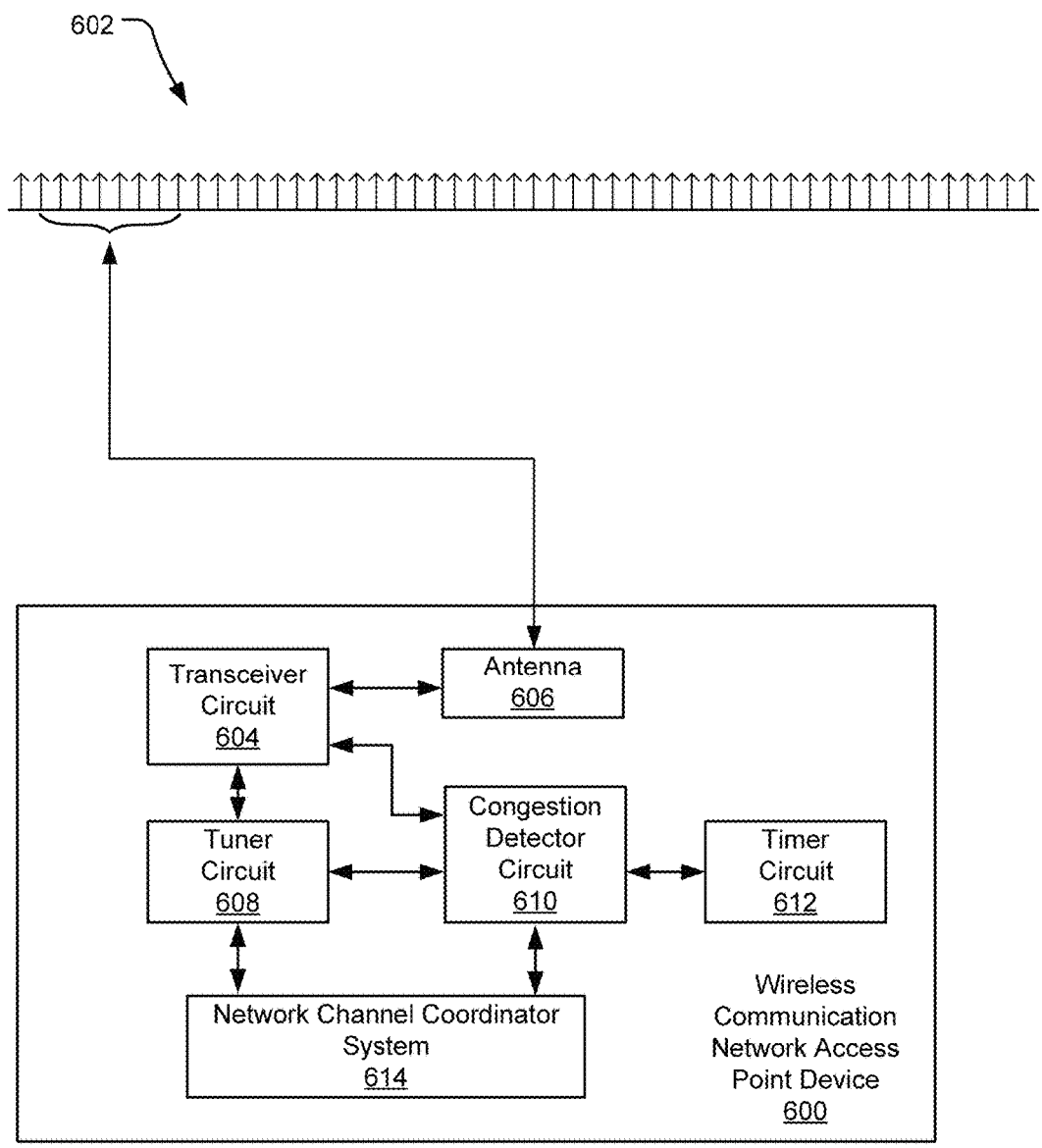
FIG. 6 illustrates an example schematic of a wireless communication network access point device operating on 8 bonded channels on a wireless communication network.

FIG. 6 illustrates an example schematic of a wireless communication network access point device 600 operating on 8 bonded channels on a wireless communication network. A radiofrequency spectrum 602 illustrates multiple channels in an 802.11ac wireless communication network operating at approximately 5 GHz. Each upward-pointing arrow represents a channel within the radiofrequency spectrum 602 of the wireless communication network, and each channel has a defined bandwidth. Other wireless communications protocols may also be managed using the dynamic selection mechanism with channel bonding, in accordance with the described technology, including wireless communications protocols operating at approximately 2.4 GHz.

In one implementation, a transceiver circuit 604 and an antenna 606 in the wireless communication network access point device 600 transmits and receives signals on eight adjacent channels of the radiofrequency spectrum 602. These eight channels are considered bonded channels, in that the wireless communication network access point device 600 can communicate over the 2, 4, or 8 adjacent channels to form a single wide band channel with widths of 40, 80, and 160 MHz, respectively. When dynamically selecting and switching between wireless communications channels with channel bonding, the process includes channel selection and channel width selection before switching communications to the new bonded channels.

The wireless communications channels in which the transceiver circuit 604 and the antenna 606 are operating is set by a tuner circuit 608, which matches the operating frequencies of the antenna 306 to center within the frequency range of the 8 bonded channels. In one implementation, the tuner circuit 608 sets the frequency of electrical current fed to the antenna 606 by the transceiver 604 and can further set filtering and matching parameters of the transceiver circuit 604 and the antenna 606 to operate within the bonded channel bandwidth. By changing the frequency of the electrical current fed to the antenna 606 and associated filtering and matching parameters, the tuner 608 can cause the transceiver circuit 604 and the antenna to operate in a different set of bonded channels.

To accommodate the additional variable of channel width, one implementation scales the ineffective-time according to the channel width. Given a MaxWidth as the width of the widest possible channel (e.g., 80 MHz) and that the currently used bandwidth is CurrentWidth, line 9 of the process listed with regard to FIG. 3 is modified, in one implementation, to $t_{wasted} = t_{wasted} + \delta \times MaxWidth/CurrentWidth$.

A congestion detector circuit 610 of the wireless communication network access point device 600 monitors the ineffective-time of the communications on the first set of bonded channels. In one implementation, ineffective-time ($\tau_{wasted}$) represents the time when the wireless communication network access point device 300 is waiting for an opportunity to transmit because the bonded channels are busy. Alternatively or additionally, ineffective-time can represent the time when the wireless communication network access point device 600 is waiting for an opportunity to transmit because data packets are lost during communications in the channel. $\Psi(P)$ represents the effective time in the transmission of a data packet. Thus, $\Psi(P)$ includes the time from when the data packet is sent for transmission until the receipt of the acknowledgement (ACK) packet from the receiving node in the network, assuming no transmission-delaying congestion or packet losses (e.g., ACK packets not received in correspondence with the prior transmission of a data packet). $\Psi(P)$ also includes the time spent by the wireless communication network access point device 600 in processing a successfully received data packet from another node.

In one implementation, the wireless communication network access point device 600 increments the ineffective-time $\tau_{wasted}$ periodically based on a timer circuit 612. The wireless communication network access point device 600 can ignore (e.g., not increment) $\tau_{wasted}$ when there are no data packets in the transmit queue, because no time is being wasted in the absence of any packets to transmit. Moreover, in some implementations, congestion is identified based on transmission problems in the bonded channels. As such, without data packets to transmit, such implementations are detecting possible congestion within the bonded channels.

Upon receipt of an ACK packet corresponding to a transmitted data packet P, the congestion detector circuit 610 subtracts effective time $\Psi(P)$ from the accumulating ineffective-time $\tau_{wasted}$, such that $\tau_{wasted} = \tau_{wasted} - \Psi(P)$. If congestion in the bonded channels or packet losses exist within the bonded channels, then the resulting $\tau_{wasted}$ will be positive. Over multiple attempted transmissions, $\tau_{wasted}$ continues to increase with each failed attempted transmission while the congestion detection circuit 610 continues to monitor channel performance.

A network channel coordinator system 614 of the wireless communication network access point device 600 determines whether the channel selection condition has been satisfied. For example, if a time quantum $\tau$ was set for a first set of bonded channels, the network channel coordinator system 614 can determine whether the accumulated ineffective-time over the testing period (e.g., over 10 air-time utilization counter values) exceeds $\tau$. If not, the wireless communication network access point device 600 continues communicating on the first set of bonded channels. If so, a new set of bonded wireless communications channels is selected via the tuner circuit 608, as discussed below. The network channel coordinator system 614 informs other networked devices on the wireless network of the intent to switch bonded channel sets, and then causes the transceiver circuit 604 and antenna 602 begin transmitting on the new set of bonded channels. This detection-switching cycle continues during operation of the wireless communication network access point device 600.

Figure 7:
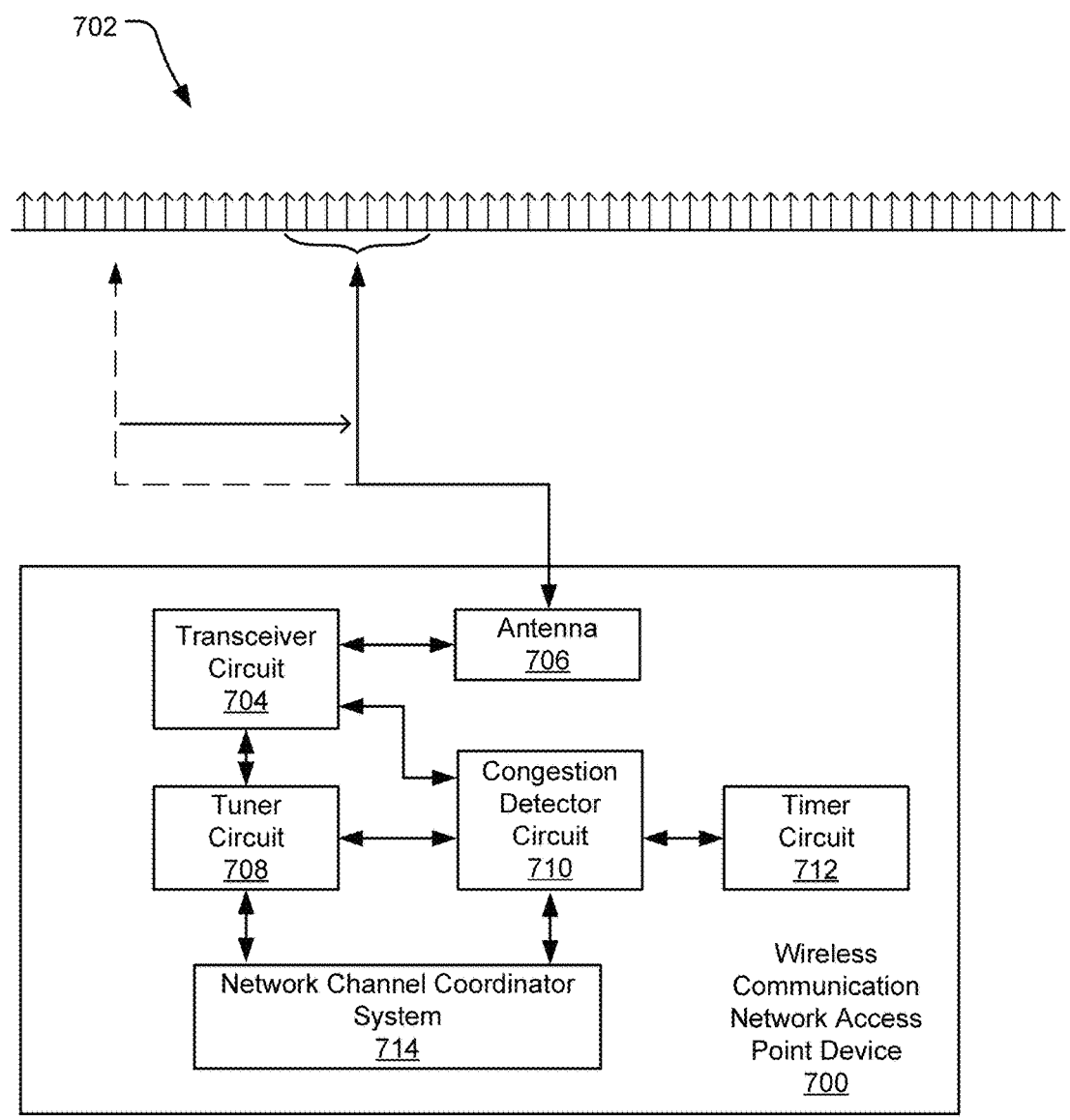
FIG. 7 illustrates an example schematic of a wireless communication network access point device operating on a second set of 8 bonded channels on a wireless communication network.

FIG. 7 illustrates an example schematic of a wireless communication network access point device 700 operating on a second set of 8 bonded channels on a wireless communication network. A radiofrequency spectrum 702 illustrates multiple channels in an 802.11ac wireless communication network operating at approximately 5 GHz. Each upward-pointing arrow represents a channel within the radiofrequency spectrum 702 of the wireless communication network, and each channel has a defined bandwidth. Other wireless communications protocols may also be managed using the dynamic selection mechanism with channel bonding, in accordance with the described technology, including wireless communications protocols operating at approximately 2.4 GHz.

In one implementation, the congestion detector circuit 710 has detected congestion and/or packet losses during transmission in the first set of bonded channels and has determined that the detected congestion satisfies a channel selection condition set for the first set of bonded channels. As a result, the congestion detector circuit 710 triggers a network channel coordinator system 714 to initiate a dynamic channel selection and switch. The network channel coordinator system 714 signals other networked devices within the wireless communication network of the impending channel change, identifying the new set of bonded channels, and then signals the tuner circuit 708 to change transmission and reception by a transceiver circuit 704 and an antenna 706 to the new set of bonded channels.

Upon switching to the new channel, the congestion detector circuit 710 sets a channel selection condition for the new channel, resets the ineffective-time $\tau_{wasted}$, and begins accumulating $\tau_{wasted}$ based on periodic incrementing of $\tau_{wasted}$ (according to the timer circuit 712) and measuring of $\Psi(P)$ for each attempted transmission.

In an alternative implementation, a timer circuit presents a challenge because the time speed and accuracy to support certain wireless communications protocols are difficult or expensive to satisfy using a timer circuit. Accordingly, the timer can be omitted by timestamping each data packet before it is enqueued in the transmit queue.

The following example operation listing may be preceded by an initial selection of a first channel (e.g., a random selection).

```
1:   repeat
2:       HopToSelectedChannel(Channels)
3:       τ = Exp(α)
4:       t_wasted=0; PreviousDoneTime=0; NumQueue=0
5:       repeat
6:           // Packet (P) transmission processing (tx.c)
7:               NumQueue++
8:               P.TxStartTime=ktime( )
9:               Queue packet (P) in transmit queue
10:          // Packet (P) transmit status processing (status.c)
11:              P.TxStartTime=ktime( )
12:              NumQueue--
13:              If (PrevDoneTime > P.TxStartTime) then
14:                  TimeHeadOfQueue = P.TxDoneTime -
                     PrevDoneTime
15:              else
                     TimeHeadOfQueue = P.TxDoneTime -
16:                  P.TxStartTime
17:              end if
18:              t_wasted = t_wasted + TimeHeadOfQueue - ψ(P)
19:              PrevDoneTime = P.TxDoneTime
20:          // Packet (P) Received Event processing (rx.c)
21:              If (NumQueue > 0) then
22:                  t_wasted = t_wasted - ψ(P)
23:              end if
24:      until t_wasted > τ
25:      Select new channel
26:      Add CSA with decreasing counts to Beacon for five beacons
27:  until true
```

The congestion detector timestamps each packet before it is enqueued to the transmit queue for transmission (line 8). When the transceiver circuit issues an interrupt to provide the status of the ensuing transmission (e.g., whether the transmission was successful and at what physical transmission rate), the timestamp of the interrupt is also recorded (line 11). To compute ineffective-time $\tau_{wasted}$, the time the transmitted data packets resided in the start of the transmit queue is estimated (lines 13-1) and ineffective-time $\tau_{wasted}$ is determined as the difference between the time the data packet stayed at the head of the transmit queue and the actual time for successful transmission (line 18). The average value for a typical Carrier Sense Multiple Access (CSMA) contention time and the preamble and Short Interframe Space/ Acknowledgement (SIFS/ACK) overheads may also be considered when computing ψ(P).

If there is packet loss for any reason, ψ(P)=0. Further, when the wireless communication network access point device 700 receives an uplink packet when the transmit queue is non-empty, since this represents useful time, $t_{wasted}$ is against reduced by ψ(P) ($t_{wasted}=t_{wasted}-\psi(P)$) in lines 21-23.

Responsive to satisfaction of the dynamic selection condition in line 24, a new channel is selected (e.g., randomly) in line 25. Furthermore, in one implementation, to notify clients before a channel change, a channel switch announcements (CSA) Information Element is included in the beacons of line 26. The CSA includes an extra 5 bytes and includes a channel number field, which indicates the new bonded channel set, and a count field, which notifies when the switch to the new bonded channel set will occur. In this manner, other networked devices within the wireless communication network are synchronized concurrently to the new set of bonded channels. Other notification approaches may be employed.

Figure 8:
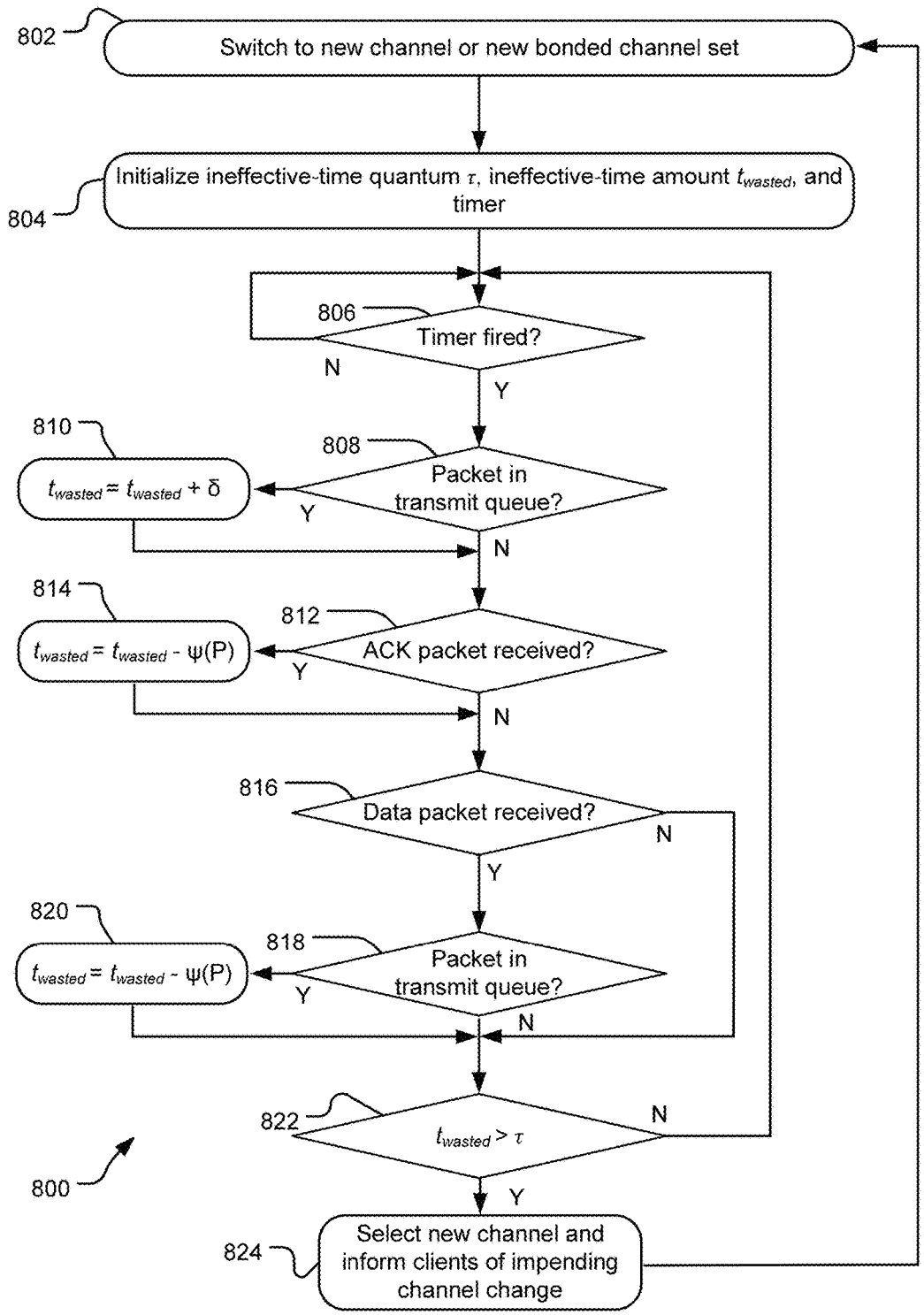
FIG. 8 illustrates example operations for executing dynamic channel selection in a wireless communication network using a timer.

FIG. 8 illustrates example operations 800 for executing dynamic channel selection in a wireless communication network using a timer. A channel switching operation 802 tunes a transceiver and antenna of a wireless network device to a channel or set of bonded channels. An initialization operation 804 initializes an ineffective-time quantum τ (e.g., using an exponentially distributed random function or other randomization function). The ineffective-time quantum τ may be set for each new channel selected or on some other varying basis (a certain randomized period, a certain randomized number of channel selections, etc.). The initialization operation 804 also sets the initial value of the ineffective-time accumulator $t_{wasted}$ (e.g., setting it to zero or some other initial value) and resets the timer to fire every firing period δ.

A decision operation 806 determines whether the timer has fired. If not, the decision operation 806 loops until a timer firing has been detected. If the timer has fired, processing proceeds to a decision operation 808 to determine whether data packets are present in the transmit queue. If so, $t_{wasted}$ is incremented by the firing period δ in an incrementing operation 810. (If no data packets are present in the transmit queue, then no time is deemed to have been wasted.)

Another decision operation 812 determines whether an ACK packet has been received for a previously transmitted data packet. If so, $t_{wasted}$ is decremented by the effective time ψ(P) for the data packet P associated with the ACK packet in an operation 814.

Yet another decision operation 816 determines whether a data packet has been received by the wireless network device. In one implementation, the transceiver circuitry or other circuitry issues an interrupt indicating receipt of a data packet, although other implementation may employ polling a register, etc. If so, a decision operation 818 determines whether a data packet is present in the transmit queue (e.g., by checking a register in the wireless network device). If so, $t_{wasted}$ is decremented by the effective time ψ(P) for the received data packet P in an operation 820.

A decision operation 822 determines whether a channel selection condition has been satisfied. In one implementation, as shown in the decision operation 822, the channel selection condition is based on a determination of whether the accumulated $t_{wasted}$ exceeds the ineffective-time quantum τ, although other approaches and channel selection conditions may be employed. If the channel selection condition is not satisfied, processing returns to decision block 806 to determine whether the timer has fired again. If the channel selection condition is satisfied, a signaling operation 824 selects a new channel (e.g., randomly) and informs other wireless network devices of the impending channel change, notifying them of the selected new channel or new set of bonded channels, and processing returns to the switching operation 802 to select and switch to the a randomly selected new channel or set of bonded channels.

In one implementation, to notify clients before a channel change, a channel switch announcements (CSA) Information Element is included in beacons. The CSA includes an extra 5 bytes and includes a channel number field, which indicates the new bonded channel set, and a count field, which notifies when the switch to the new bonded channel set will occur. In this manner, other networked devices within the wireless communication network are synchronized concurrently to the new set of bonded channels. Other notification approaches may be employed.

The process repeats during operation of the wireless network device, seeking an overall improved network performance through dynamic channel (or bonded channels) selection and switching approach. It should be noted that communication over each newly selected channel proceeds before measurement and/or evaluation of the channel performance against the channel selection conditions is initiated.

Figure 9:
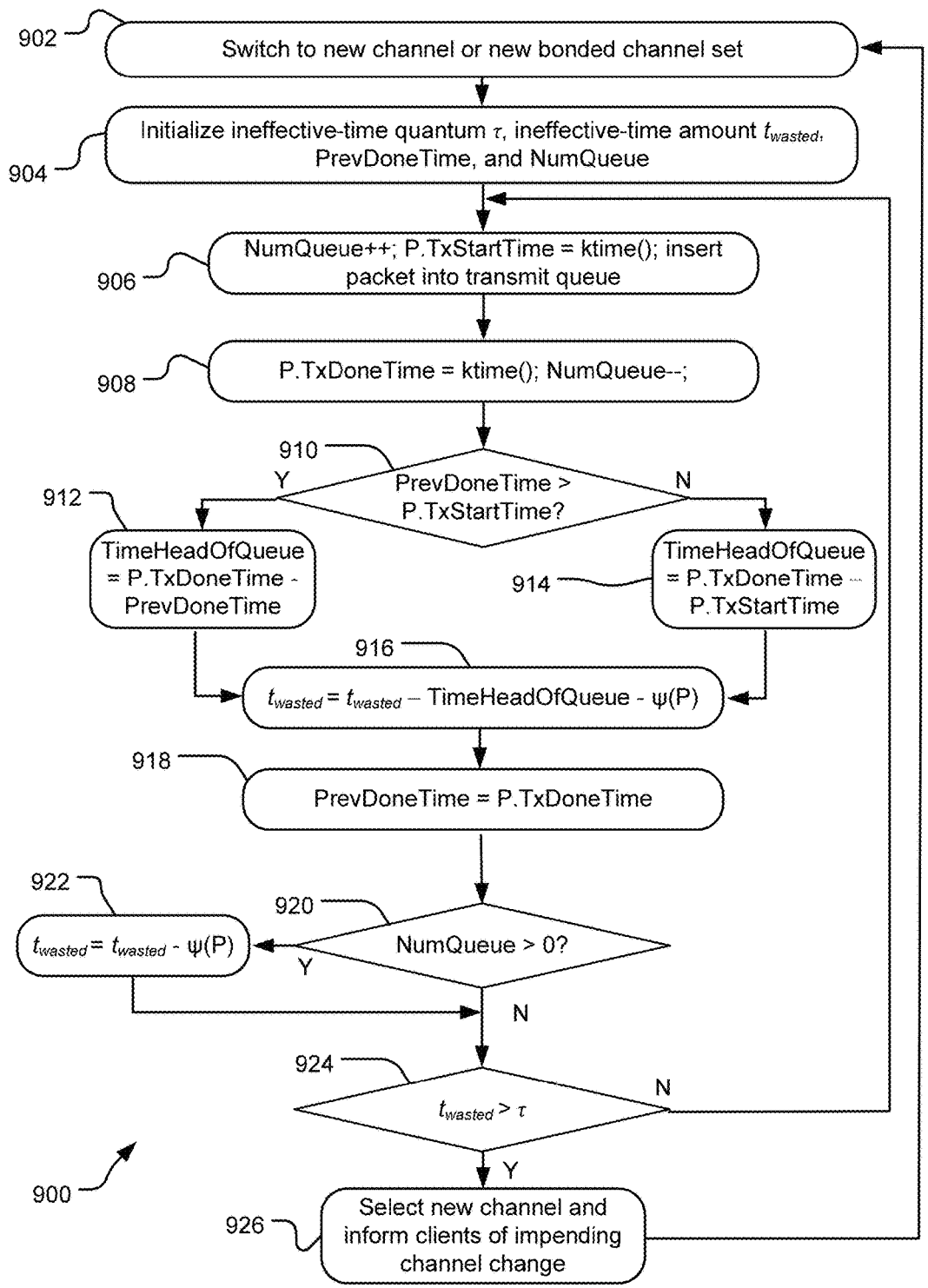
FIG. 9 illustrates example operations for executing dynamic channel selection in a wireless communication network using interrupts.

FIG. 9 illustrates example operations 900 for executing dynamic channel selection in a wireless communication network using interrupts. By omitting a timer-dependency, the speed parameters and/or cost of a timer circuit become moot. A channel switching operation 902 tunes a transceiver and antenna of a wireless network device to a channel or set of bonded channels. An initialization operation 904 initializes an ineffective-time quantum τ (e.g., using an exponentially distributed random function or other randomization function). The ineffective-time quantum τ may be set for each new channel selected or on some other varying basis (a certain randomized period, a certain randomized number of channel selections, etc.). The initialization operation 904 also sets the initial value of the ineffective-time accumulator $t_{wasted}$, PrevDoneTime parameter, and the NumQueue parameter (e.g., setting them to zero or some other initial value). The PrevDoneTime value represents an accumulator of the time a data packet has resided at the head of the transmit queue. The NumQueue value represents an accumulator indicating the number of data packets in the transmit queue.

To process a data packet P transmission event, a setting operation 906 increments NumQueue for the new data packet to be transmitted, sets a P.TxStartTime value using a timestamp function ktime( ), and inserts the new data packet into the transmit queue. When a hardware interrupt is detected indicating the receipt of an ACK packet corresponding to the transmitted data packet P, a transmit completion operation 908 sets a P.TxDoneTime value using a time stamp function ktime( ) and decrements NumQueue.

A decision operation 910 determines whether the PrevDoneTime exceeds the P.TxStartTime. If so, the wasted time spent by the data packet P at the head of the transmit queue is set to TimeHeadOfQueue=P.TxDoneTime-PrevDoneTime in operation 912. Otherwise, the wasted time spent by the data packet P at the head of the transmit queue is set to TimeHeadOfQueue=P.TxDoneTime-P.TxStartTime in operation 914. An updating operation 916 sets the ineffective-time accumulator $t_{wasted}$ to $t_{wasted}$, minus TimeHeadOfQueue minus the effective time ψ(P). An updating operation 918 updates PrevDoneTime to P.TxDoneTime.

Determining effective-time associated with receiving a data packet involves another decision operation 920 that determines if other data packets reside in the transmit queue. If so, an updating operation 922 sets the ineffective-time accumulator $t_{wasted}$ to $t_{wasted}$, minus the effective time ψ(P).

A decision operation 924 determines whether a channel selection condition has been satisfied. In one implementation, as shown in the decision operation 924, the channel selection condition is based on a determination of whether the accumulated $t_{wasted}$ exceeds the ineffective-time quantum τ, although other approaches and channel selection conditions may be employed. If the channel selection condition is not satisfied, processing returns to the setting operation 906 and repeats the processing from that point. Otherwise, a signaling operation 926 selects a new channel (e.g., randomly) and informs other wireless network devices of the impending channel change, notifying them of the selected new channel or new set of bonded channels, and processing returns to the switching operation 902 to select and switch to the a randomly selected new channel or set of bonded channels.

In one implementation, the signaling operation 926 notifies other wireless network devices on the wireless communication network of the impending channel change via a Channel Switch Announcement (CSA) Information element in beacons communicated throughout the wireless communication network. The CSA Information Element adds an additional 5 bytes to the beacon. The CSA includes a channel number field, which indicates the new channel, and the count field, which notifies these devices when the switch will happen. Processing then returns to the switching operation 902 to implement the switch to the new channel or set of bonded channels.

The process repeats during operation of the wireless network device, seeking an overall improved network performance through dynamic channel (or bonded channels) selection and switching approach. It should be noted that communication over each newly selected channel proceeds before measurement and/or evaluation of the channel performance against the channel selection conditions is initiated.

Figure 10:
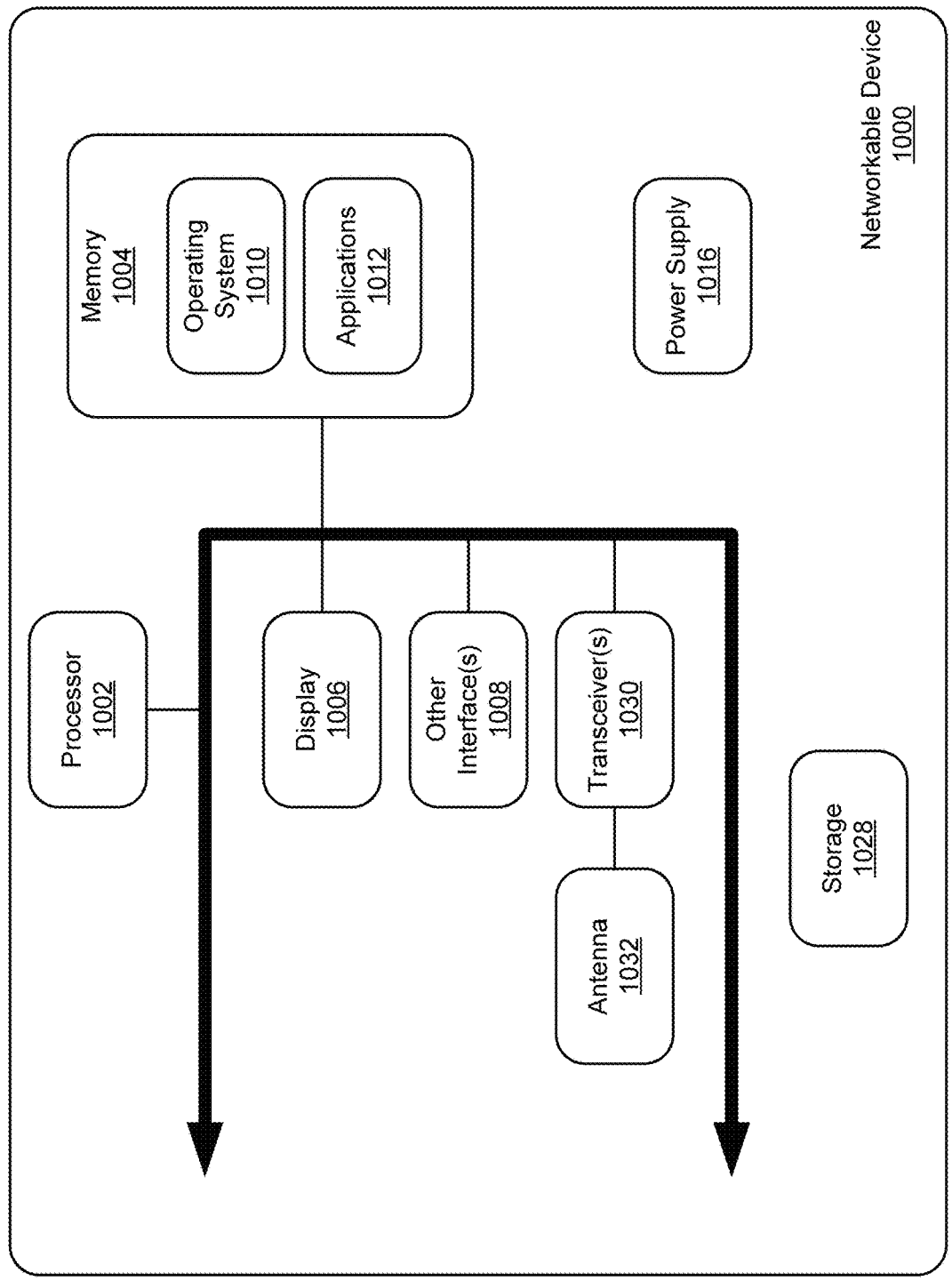
FIG. 10 illustrates an example schematic of a networkable device configured to perform dynamic channel selection in wireless communication network.

FIG. 10 illustrates an example schematic of a networkable device 1000 configured to perform dynamic channel selection in wireless communication network. The networkable device 1000 includes one or more processors 1002, memory 1004, a display 1006 (e.g., a touchscreen display or lights), and other interfaces 1008 (e.g., a buttons). The memory 1004 generally includes both volatile memory (e.g., RAM) and non-volatile memory (e.g., flash memory). An operating system 1010, such as the Microsoft Windows® Phone operating system or a specific operating system designed for a networkable device, such as a wireless communication network access point device, resides in the memory 1004 and is executed by the processor 1002, although it should be understood that other operating systems may be employed.

One or more application programs 1012, such as a dynamic channel selection and/or switching system, are loaded in the memory 1004 and executed on the operating system 1010 by the processor 1002.

The networkable device 1000 includes a power supply 1016, which is powered by one or more batteries or other power sources and which provides power to other components of the networkable device 1000. The power supply 1016 may also be connected to an external power source that overrides or recharges the built-in batteries or other power sources.

The networkable device 1000 includes one or more communication transceivers 1030 and an antenna 1032 to provide network connectivity (e.g., a mobile phone network, Wi-Fi®, BlueTooth®, etc.). The networkable device 1000 may also include various other components, such as a positioning system (e.g., a global positioning satellite transceiver), one or more accelerometers, one or more cameras, an audio interface (e.g., a microphone, an audio amplifier and speaker and/or audio jack), and additional storage 1028. Other configurations may also be employed.

In an example implementation, a mobile operating system, various applications (including a dynamic channel selection/and/or switching control system), and other modules and services may be embodied by instructions stored in memory 1004 and/or storage devices 1028 and processed by the processing unit 1002. Device settings, ineffective time metrics, available channels, service options, and other data may be stored in memory 1004 and/or storage devices 1028 as persistent datastores.

The networkable device 1000 may include a variety of tangible computer-readable storage media and intangible computer-readable communication signals. Tangible computer-readable storage can be embodied by any available media that can be accessed by the networkable device 1000 and includes both volatile and nonvolatile storage media, removable and non-removable storage media. Tangible computer-readable storage media excludes intangible communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can accessed by the networkable device 1000. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some embodiments may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

An example network device for dynamically switching a communications channel within a wireless communication network of networked devices includes a congestion detector circuit, a network channel coordinator system, and a tuner circuit, a transceiver circuit, and an antenna coupled to the network channel coordinator system. The congestion detector circuit measures an ineffective communication metric over time on a first channel of the wireless communication network and detects that the measured ineffective communication metric satisfies a channel selection condition on the first channel. The network channel coordinator system is coupled to the congestion detector circuit. The network channel coordinator system signals the networked devices of the wireless communication network to switch communication to a second channel, responsive to satisfaction of the channel selection condition on the first channel. The tuner circuit, transceiver circuit, and antenna initiate communications by the network device on the second channel. The network channel coordinator system measures the ineffective communication metric over time on the second channel of the wireless communication network after initiation of communications by the network device on the second channel.

In another example device of any preceding device, the channel selection condition is dependent upon the ineffective communication metric. The ineffective communication metric represents the ineffective transmission time within the network device.

In another example device of any preceding device, the ineffective communication metric is accumulated for the first channel over time. The channel selection condition is satisfied by the ineffective communication metric when the accumulated ineffective communication metric exceeds an ineffective-time quantum.

Another example device of any preceding device includes an ineffective-time quantum determined from an exponentially-distributed random set.

In another example device of any preceding device, the ineffective-time quantum is randomly determined for each newly selected channel for each selection cycle.

Another example device of any preceding device includes a network channel coordinator system that selects the second channel randomly from a set of available channels on the wireless communication network.

Another example device of any preceding device includes a congestion detector circuit that monitors communications parameters of the transceiver circuit during periods triggered by a timer.

In another example device of any preceding device, the ineffective communication metric is measured responsive to receipt by the network device of an acknowledgement packet corresponding to a previously transmitted data packet.

In another example device of any preceding device, the ineffective communication metric is measured responsive to receipt of a data packet by the network device.

In another example device of any preceding device, the ineffective communication metric is triggered by receipt of a hardware interrupt from the transceiver circuit.

An example device for dynamically switching a communications channel within a wireless communication network of networked devices includes means for measuring the ineffective communication metric, means for detecting that the measured ineffective communication metric in the network device satisfies the channel selection condition on the first channel, means for signaling the networked devices of the wireless communication network to switch communications to the second channel, means for initiating communications by the network device on the second channel, and means for measuring the ineffective communication metric by the network device over time. The means for measuring an ineffective communication metric in a network device of the networked devices measure the ineffective communication metric over time on the first channel of the wireless communication network. The means for signaling the networked devices of the wireless communication by the network device on the second channel signal in response to the satisfaction of the channel selection condition on the first channel. The means for measuring the ineffective communication metric by the network device over time measure the ineffective communication metric on the second channel of the wireless communication network after initiating communications by the network device on the second channel.

In another example device of any preceding device, the channel selection condition is dependent upon the ineffective communication metric. The ineffective communication metric represents ineffective transmission time within the network device.

In another example device of any preceding device, the ineffective communication metric is accumulated for the first channel over time. The channel selection condition is satisfied by the ineffective communication metric when the accumulated ineffective communication metric exceeds an ineffective-time quantum.

Another example device of any preceding device includes an ineffective-time quantum that is determined from an exponentially-distributed random set.

Another example device of any preceding device includes an ineffective-time quantum that is randomly determined for each newly selected channel for each selection cycle.

In another example device of any preceding device, the second channel is selected randomly from a set of available channels on the wireless communication network.

In another example device of any preceding device, the ineffective communication metric is determined by monitoring communications parameters of a transceiver circuit during periods triggered by a timer.

In another example device of any preceding device, the ineffective communication metric is measured in response to receipt by the network device of an acknowledgement packet corresponding to a previously transmitted data packet.

In another example device of any preceding device, the ineffective communication metric is measured in response to receipt of a data packet by the network device.

An example device of one or more tangible processor-readable storage media embodied with instructions for executing on one or more processors and circuits of a network device includes means for measuring an ineffective communication metric in the network, means for detecting that the measured ineffective communication metric in the network device satisfies a channel selection condition on the first channel, means for signaling the networked devices of the wireless communication network to switch communications to the second channel, means for initiating communications by the network device on the second channel, and means for measuring the ineffective communication metric by network devices over time on the second channel. The means for measuring the ineffective communication metric in the network measure the ineffective communication metric in the network device over time on the first channel of the wireless communication network. The means for signaling the networked devices of the wireless communication by the network device on the second channel signal in response to the satisfaction of the channel selection condition on the first channel. The means for measuring the ineffective communication metric by the network device over time measure the ineffective communication metric on the second channel of the wireless communication network after initiating communications by the network device on the second channel.

The implementations of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the invention. Since many implementations of the invention can be made without departing from the spirit and scope of the invention, the invention resides in the claims hereinafter appended. Furthermore, structural features of the different embodiments may be combined in yet another implementation without departing from the recited claims.

What is claimed is:

1. A network device for dynamically switching a communications channel within a wireless communication network of networked devices, the system comprising:
    a congestion detector circuit of the network device that accumulates an ineffective transmission time metric over time on a first channel of the wireless communication network and detects that the accumulated ineffective transmission time metric satisfies a channel selection condition on the first channel;
    a network channel coordinator system of the network device and coupled to the congestion detector circuit that signals the networked devices of the wireless communication network to switch communications to a second channel, responsive to detection that the accumulated ineffective transmission time metric satisfies the channel selection condition on the first channel; and
    a tuner circuit, a transceiver circuit, and an antenna coupled to the network channel coordinator system that initiate communications by the network device on the second channel, the congestion detector circuit accumulating an ineffective transmission time metric over time on the second channel of the wireless communication network after initiation of the communications by the network device on the second channel.

2. The network device of claim 1 wherein the channel selection condition is dependent upon the ineffective metric, the ineffective communication metric representing ineffective transmission time within the network device.

3. The network device of claim 1 wherein the ineffective transmission time metric is accumulated for the first channel over time and the channel selection condition is satisfied by the ineffective communication metric when the accumulated ineffective transmission time metric exceeds an ineffective-time quantum.

4. The network device of claim 3 wherein the ineffective-time quantum is determined from an exponentially-distributed random set.

5. The network device of claim 3 wherein the ineffective-time quantum is randomly determined for each newly selected channel for each selection cycle.

6. The network device of claim 1 wherein the network channel coordinator system selects the second channel randomly from a set of available channels on the wireless communication network.

7. The network device of claim 1 wherein the congestion detector circuit monitors communications parameters of the transceiver circuit during periods triggered by a timer.

8. The network device of claim 1 wherein the ineffective transmission time metric is measured responsive to receipt by the network device of an acknowledgement packet corresponding to a previously transmitted data packet.

9. The network device of claim 1 wherein the ineffective transmission time metric is measured responsive to receipt of a data packet by the network device.

10. The network device of claim 1 wherein the measurement of the ineffective transmission time metric is triggered by receipt of a hardware interrupt from the transceiver circuit.

11. The network device of claim 1 wherein satisfaction of the channel selection condition on the first channel is independent of any transmission activity metric of any other channel of the wireless communication network.

12. The network device of claim 1 wherein the accumulation of the ineffective transmission time is dependent on whether one or more data packets are present in a transmit queue of the network device.

13. A method of dynamically switching a communications channel within a wireless communication network of networked devices, the method comprising:
   accumulating an ineffective transmission time metric in a network device of the networked devices over time on a first channel of the wireless communication network;
   detecting that the accumulated ineffective transmission time metric in the network device satisfies a channel selection condition on the first channel;
   signaling the networked devices of the wireless communication network to switch communications to a second channel, responsive to detection that the accumulated ineffective transmission time metric satisfies the channel selection condition on the first channel;
   initiating communications by the network device on the second channel; and
   accumulating an ineffective transmission time metric by the network device over time on the second channel of the wireless communication network after initiating the communications by the network device on the second channel.

14. The method of claim 13 wherein the channel selection condition is dependent upon the ineffective transmission time metric, the ineffective transmission time metric representing ineffective transmission time within the network device.

15. The method of claim 13 wherein the ineffective transmission time metric is accumulated for the first channel over time and the channel selection condition is satisfied by the ineffective transmission time metric when the accumulated ineffective transmission time metric exceeds an ineffective-time quantum.

16. The method of claim 15 wherein the ineffective-time quantum is determined from an exponentially-distributed random set.

17. The method of claim 15 wherein the ineffective-time quantum is randomly determined for each newly selected channel for each selection cycle.

18. The method of claim 13 wherein the second channel is selected randomly from a set of available channels on the wireless communication network.

19. The method of claim 13 wherein the ineffective transmission time metric is determined by monitoring communications parameters of a transceiver circuit during periods triggered by a timer.

20. The method of claim 13 wherein the ineffective transmission time metric is measured responsive to receipt by the network device of an acknowledgement packet corresponding to a previously transmitted data packet.

21. The method of claim 13 wherein the ineffective transmission time metric is measured responsive to receipt of a data packet by the network device.

22. One or more tangible processor-readable storage media embodied with instructions for executing on one or more processors and circuits of a network device a process comprising:
   accumulating an ineffective transmission time metric in the network device over time on a first channel of the wireless communication network;
   detecting that the accumulated ineffective transmission time metric in the network device satisfies a channel selection condition on the first channel;
   signaling the networked devices of the wireless communication network to switch communications to a second channel, responsive to detection that the accumulated ineffective transmission time metric satisfies the channel selection condition on the first channel;
   initiating communications by the network device on the second channel; and
   accumulating an ineffective transmission time metric by the network devices over time on the second channel of the wireless communication network after initiating the communications by the network device on the second channel.

* * * * *